United States Patent
Boyl-Davis et al.

(10) Patent No.: US 7,526,851 B1
(45) Date of Patent: May 5, 2009

(54) CONFORMAL VACUUM CUP APPARATUS AND METHOD

(75) Inventors: Theodore M. Boyl-Davis, Snohomish, WA (US); James N. Buttrick, Jr., Seattle, WA (US); Darrell D. Jones, Mill Creek, WA (US)

(73) Assignee: The Boeing Company, Chicago, IL (US)

( * ) Notice: Subject to any disclaimer, the term of this patent is extended or adjusted under 35 U.S.C. 154(b) by 186 days.

(21) Appl. No.: 11/505,951

(22) Filed: Aug. 18, 2006

Related U.S. Application Data

(62) Division of application No. 10/854,209, filed on May 27, 2004, now Pat. No. 7,134,649.

(51) Int. Cl.
*B23Q 7/00* (2006.01)
*B23P 19/00* (2006.01)

(52) U.S. Cl. .......................................... 29/559; 29/743

(58) Field of Classification Search ................ 29/524.1, 29/559, 743; 269/21, 20, 289 R, 303, 266; 266/56; 294/64 R; 408/76
See application file for complete search history.

(56) References Cited

U.S. PATENT DOCUMENTS

| 2,910,895 A | 11/1959 | Winslow |
| 2,946,246 A | 7/1960 | Allen |
| 3,575,364 A * | 4/1971 | Frederick ...................... 266/56 |
| 3,591,228 A | 7/1971 | Tudor-Webb |
| 4,640,661 A | 2/1987 | Rasmussen |
| 5,120,033 A | 6/1992 | Shoda |
| 5,457,868 A | 10/1995 | Blaimschein |
| 5,704,599 A | 1/1998 | Slothower |
| 5,865,827 A | 2/1999 | Bullister |
| 6,068,547 A | 5/2000 | Lupi |
| 6,655,671 B2 | 12/2003 | Iwaki |
| 6,796,014 B2 | 9/2004 | Sarh |

FOREIGN PATENT DOCUMENTS

DE 42 03 808 A1 8/1993

* cited by examiner

*Primary Examiner*—John C Hong

(57) ABSTRACT

During the manufacture an aircraft, a tool-carrying rail is removably attached to a rail-side surface of the aircraft with a vacuum cup. The tool-carrying rail includes a longitudinal axis to mount a tool. The vacuum cup is stiffened along a first axis transverse to the longitudinal axis of the tool-carrying rail and the vacuum cup is stiffened along a second axis parallel to the rail-side surface of the aircraft. To removably attach the tool-carrying rail, a perimeter of the vacuum cup is removably sealed to the rail-side surface of the aircraft against vacuum loss and a point on the rail is rigidly positioned with respect to a point on the rail-side surface of the aircraft. In addition, a vacuum source is coupled to a spatial volume occupying all of a space between the vacuum cup and the rail-side surface of the aircraft and the tool is slidably positioned along the longitudinal axis of the tool-carrying rail.

17 Claims, 8 Drawing Sheets

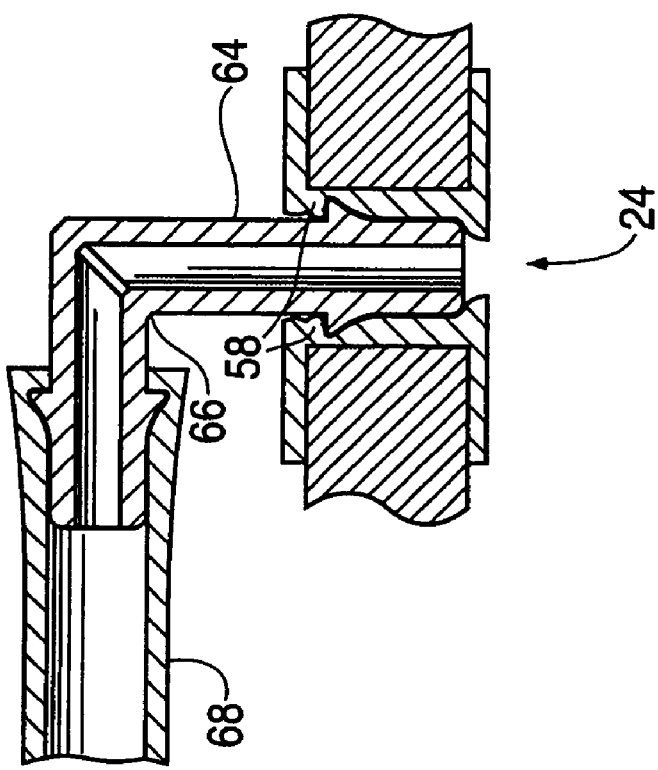
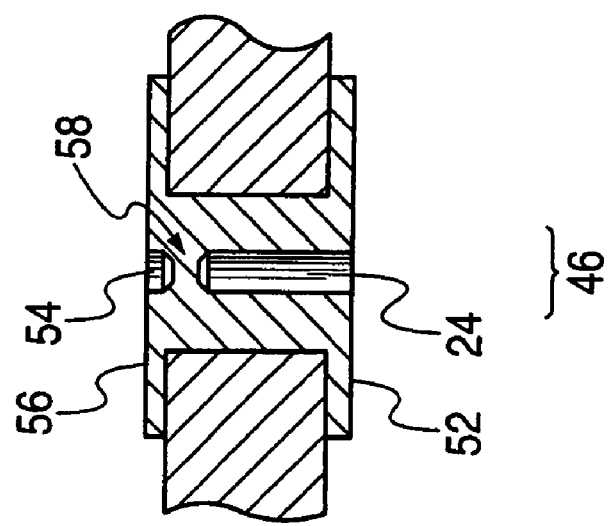

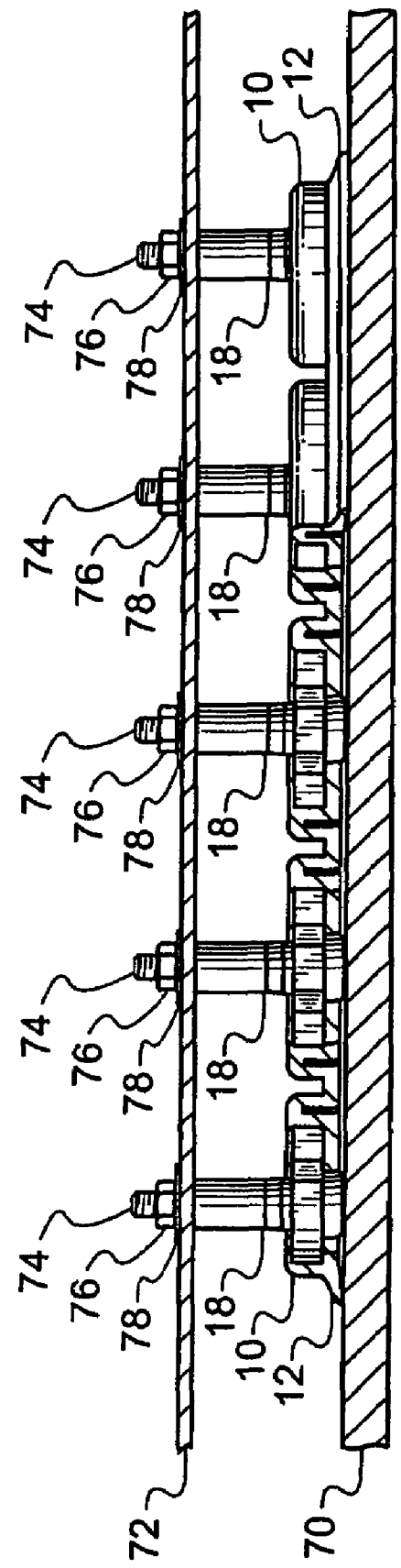

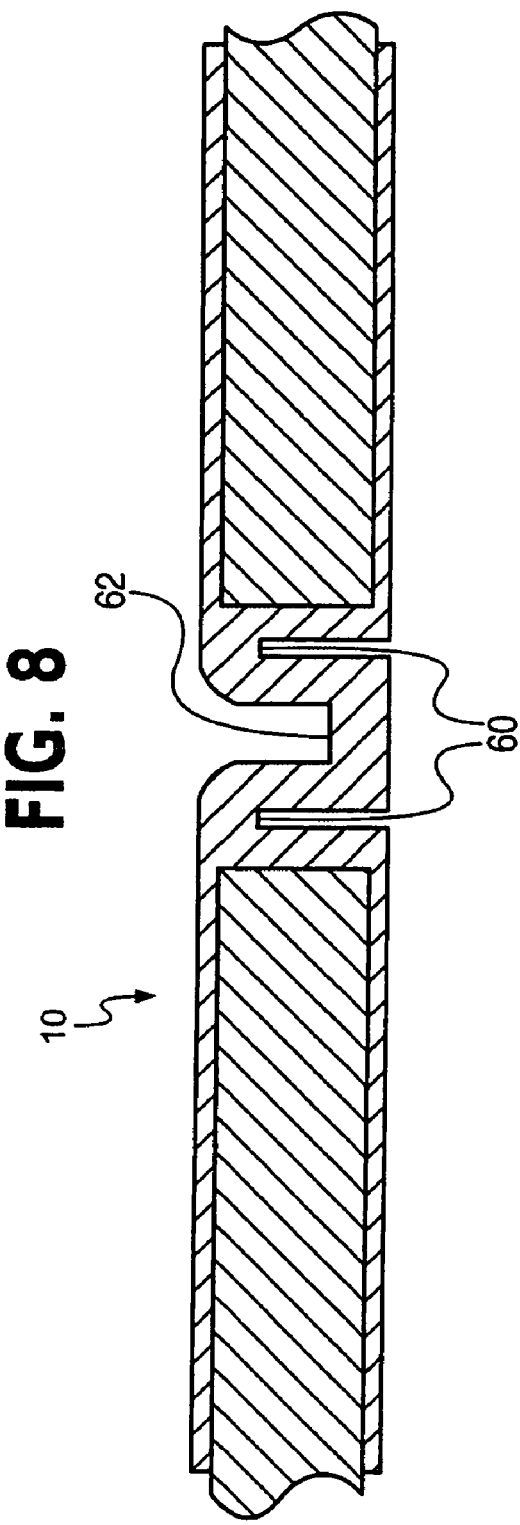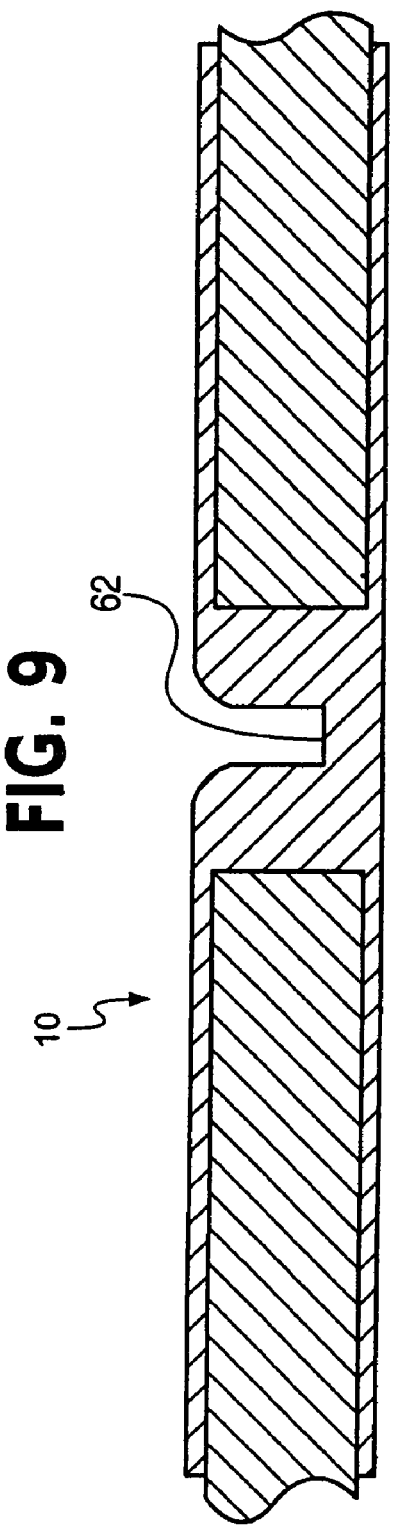

CONFORMAL VACUUM CUP APPARATUS AND METHOD

CROSS REFERENCE TO RELATED APPLICATIONS

This application claims priority of and is a divisional application to U.S. patent application Ser. No. 10/854,209, filed on May 27, 2004, now U.S. Pat. No. 7,134,649 titled "CONFORMAL VACUUM CUP APPARATUS AND METHOD," the disclosure of which is incorporated herein by reference in its entirety.

FIELD OF THE INVENTION

The present invention relates generally to manufacturing tools and automation. More particularly, the present invention relates to attachment of rail-mounted machine tools to work surfaces.

BACKGROUND OF THE INVENTION

Portable, vacuum-cup-attached systems for drilling or fastening sections of aircraft fuselage or wing structures, as well as for other manufacturing operations, for other vehicle types, and for static structures, have been developed previously, but have generally been most practical for use only on workpiece areas where the contour is zero or very small in the longitudinal direction of the device. For example, some prior art vacuum cup systems could be attached readily along the flight direction of a cylindrical or otherwise highly curved fuselage, particularly where the fuselage has a long, essentially straight extent (i.e., a contour near zero), but attaching such a system to the fuselage in the circumferential direction, or fore-and-aft along a curving wing rib, would tend sometimes to produce uncertain results.

Prior art systems that use small numbers of large vacuum cups have been used, but have tended to be unable to conform smoothly to severe contours. Prior art systems with large numbers of small vacuum cups can follow a contour to some extent, but tend to be limited in the available retaining force by the necessity of having physical clearance around each vacuum cup, and by the limited available length-to-width ratio of an individual cup.

Prior art rail-mounted machine tool systems can possess the capability to advance a tool attached to a rail using a motor and gear apparatus integrated with the tool. Measurement apparatus, likewise integrated with the tool, allows the position of the tool to be determined with considerable precision. Nonetheless, prior art systems tend to be limited in their ability to conform to generalized surfaces, being best suited to positioning along low-contour paths.

Accordingly, it would be desirable to provide a method and apparatus that provides attachment of a rail system that can conform to surfaces with comparatively large contour in the longitudinal direction of traversal by the rail system and by tools carried thereon.

SUMMARY OF THE INVENTION

The conformal vacuum cup described in some embodiments comprises a resilient cup member having a series of rigid stiffener elements oriented next to each other along the longitudinal axis of a rail system. A rail can be supported by attachment to the stiffener elements. The stiffener elements can be spaced away from the rail, in a representative embodiment, using standoff pins attached to the stiffener elements and to the rail. Between each pair of stiffener elements is a gap sufficient to allow the rail to flex over a comparatively sharply curved contour without interference. A group of stiffener elements assembled in a mold can be overmolded with an elastomeric material such as urethane, which overmolding encloses all of the stiffener elements and adds a circumferential lip to establish the vacuum cup. The vacuum cup so formed can have kerf shapes formed into the gaps between adjacent stiffener elements to permit substantial motion between the stiffener elements despite the presence of the overmolded elastomer. The above standoff pins can protrude from top and/or bottom surfaces of the overmolded elastomer.

In another aspect, a vacuum cup for removable connection between a conformable, tool-carrying rail and a rail-side surface of a workpiece comprises an inner surface of the vacuum cup, an outer surface of the vacuum cup, a plurality of resilient pads joined into a contiguous whole (wherein the area between each pad and the rail-side surface of the workpiece defines a zone), a plurality of stiffener elements (wherein at least one of the plurality of stiffening elements is embedded at least partially within each respective one of the pads, and wherein the stiffener elements are attachable to the rail), and a resilient peripheral seal, joined to the pads and surrounding the periphery of all of the zones between the pads and the rail-side surface of the workpiece.

In still another aspect, a vacuum cup for removable connection between a conformable, tool-carrying rail and a rail-side surface of a workpiece comprises an inner surface of the vacuum cup, an outer surface of the vacuum cup, a plurality of resilient pads joined into a contiguous whole, wherein the area between each pad and the rail-side surface of the workpiece defines a zone, a plurality of stiffener elements, wherein one of the plurality of stiffening elements is embedded at least partially within each of the pads, and wherein the stiffener elements are attachable to the rail, and a resilient peripheral seal, joined to the pads and surrounding the periphery of all of the zones between the pads and the rail-side surface of the workpiece, and a plurality of standoff pins attached to the rail, where at least one of one of the standoff pins is attached to a respective one of each of the stiffener elements.

In still another aspect, an attachment between a rail with a longitudinal axis and a rail-side surface of the workpiece comprises means for stiffening a vacuum cup along an axis transverse to the longitudinal axis of the rail and parallel to the rail-side surface of the workpiece, means for removably sealing the stiffening means to the rail-side surface of the workpiece against vacuum loss, means for rigidly positioning a point on the rail with respect to a point on the rail-side surface of the workpiece, and means for coupling a vacuum source to a spatial volume occupying all of a space between the means for sealing and the rail-side surface of the workpiece.

In yet another aspect, a method for removably attaching a rail with a longitudinal axis to a rail-side surface of a workpiece comprises stiffening a vacuum cup along an axis transverse to the longitudinal axis of the rail and parallel to the rail-side surface of the workpiece, removably sealing a perimeter of the vacuum cup to the rail-side surface of the workpiece against vacuum loss, rigidly positioning a point on the rail with respect to a point on the rail-side surface of the workpiece, and coupling a vacuum source to a spatial volume occupying all of a space between the vacuum cup and the rail-side surface of the workpiece.

There have thus been outlined, rather broadly, certain embodiments of the invention, in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may be used readily as a basis for the designing of other structures, methods, and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 5 is a section view of a vacuum connection with an intact diaphragm.

FIG. 6 is a section view of a vacuum connection with a pierced diaphragm in which a barbed tubing coupling has been installed.

FIG. 7 is a side view with cutaway of a conformal vacuum cup installed on a rail and pressed onto a workpiece, according to the embodiment of FIG. 1.

FIG. 8 is a section view of a groove and kerfs separating two pads according to the embodiment of FIG. 1.

FIG. 9 is a section view of a groove without kerfs.

DETAILED DESCRIPTION

Figure 1:
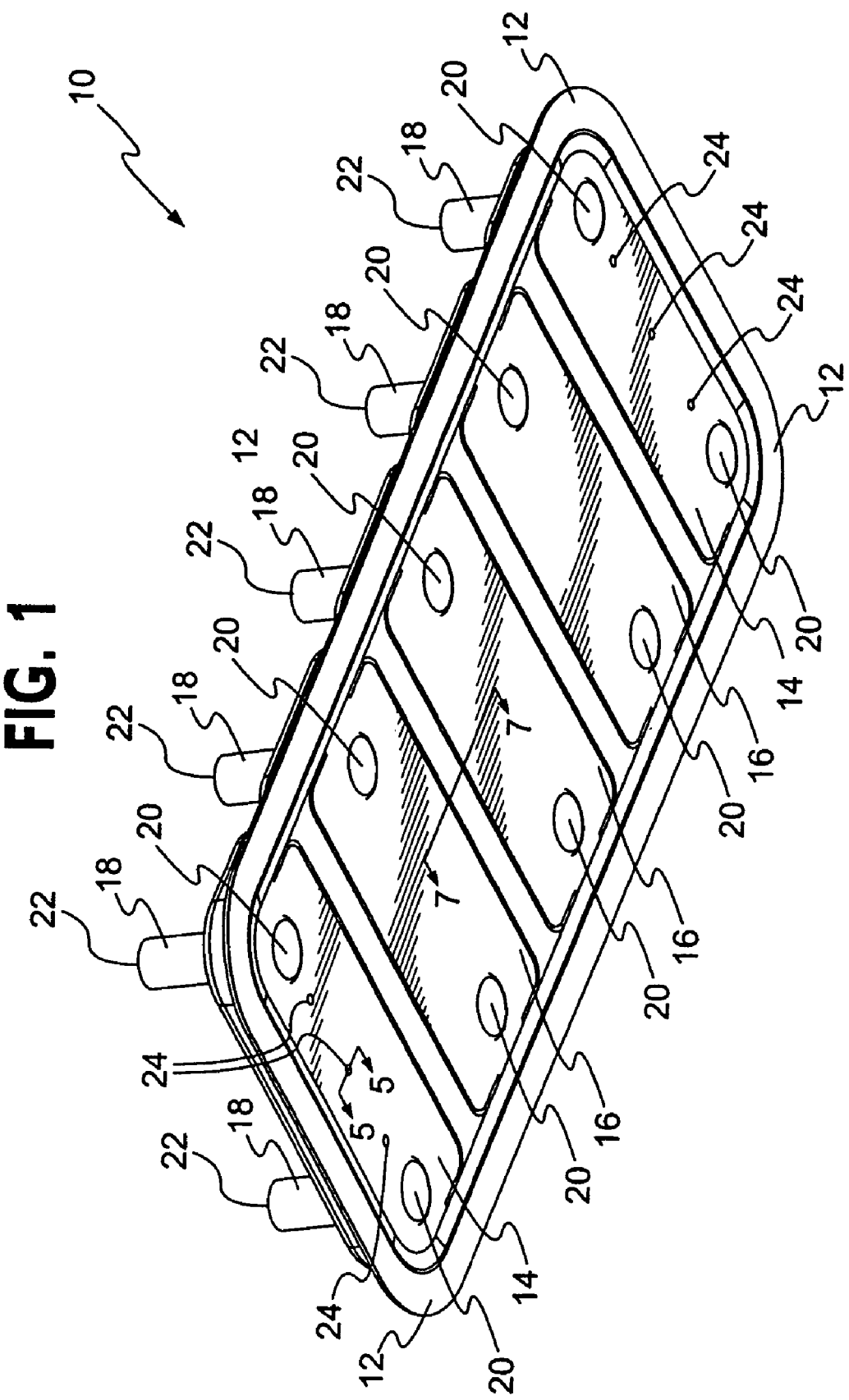
FIG. 1 is a perspective view illustrating from beneath a fully compressed conformal vacuum cup according to a preferred embodiment of the invention.

Various embodiments in accordance with the present invention provide vacuum cup apparatus and methods for attachment of devices such as, for example, a rail system used in operations such as drilling series of holes, which holes may be needed for assembling screws or rivets through airplane sheet surfaces into underlying structures. Although described in the context of aircraft manufacturing, various embodiments can also be useful in other manufacturing industries. The invention will now be described with reference to the drawing figures, in which like reference numerals refer to like parts throughout.

Figure 2:
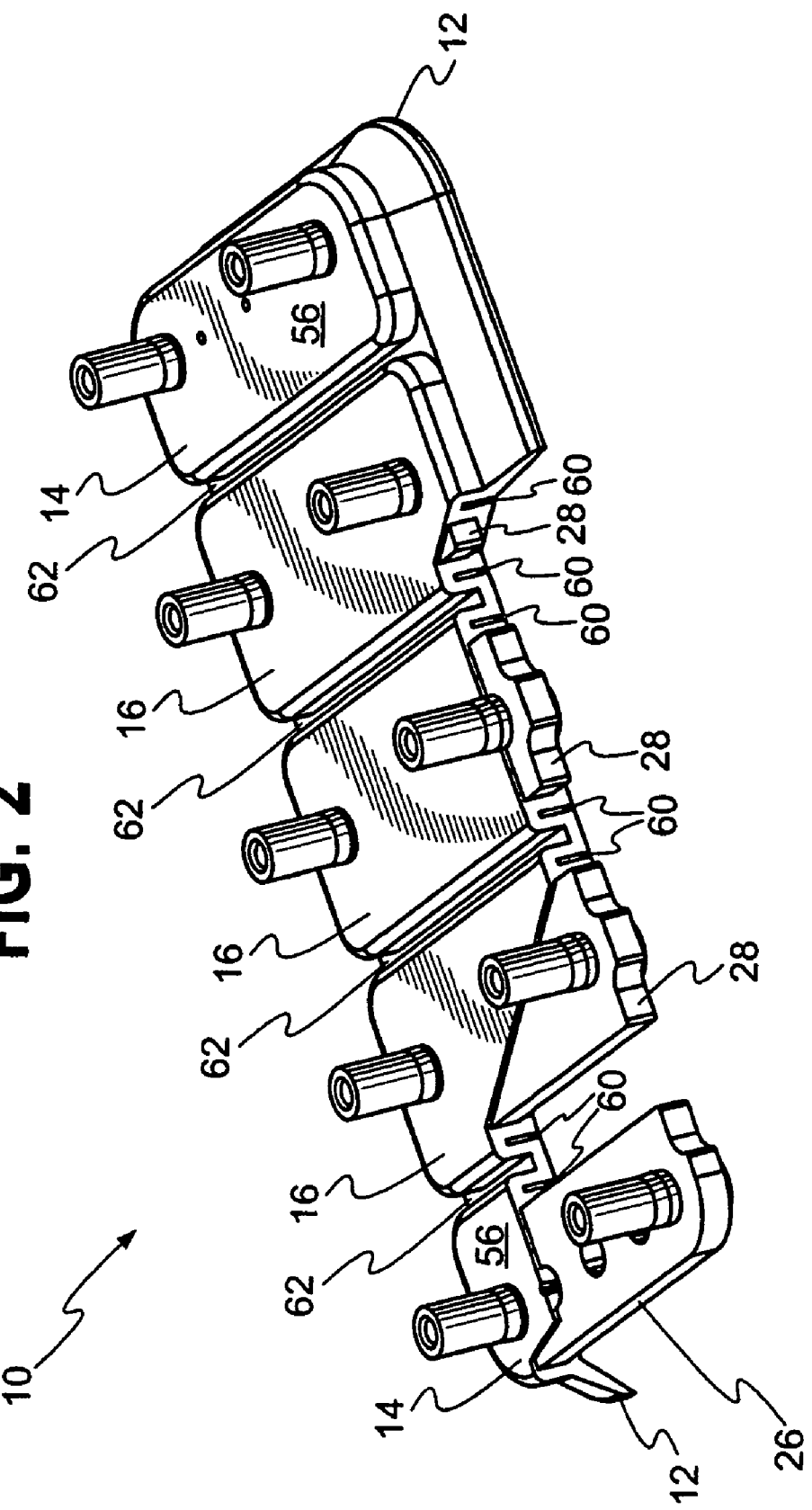
FIG. 2 is an oblique view from above with cutaway of a conformal vacuum cup according to the embodiment of FIG. 1.

FIG. 1 is an oblique bottom view that shows a fully compressed vacuum cup 10 according to an exemplary embodiment. The vacuum cup 10 has a peripheral sealing lip 12 that is shown deflected as it would be seen from below a transparent workpiece (a workpiece 70 is shown in FIGS. 7 and 11) when vacuum from an external vacuum system (shown in FIG. 10) has been applied to the volume between the cup 10 and the workpiece 70, and has caused outside air pressure to force the cup 10 against the workpiece 70. The exemplary vacuum cup 10 comprises two end pads 14 along with three intermediate pads 16. Each pad 14 or 16 comprises a stiffener (stiffeners 26 and 28 are shown in FIG. 2) encapsulated in the resilient material of the vacuum cup 10, and further comprises two standoff pins 18 with bottom ends 20 that can directly contact the workpiece when the cup 10 is compressed. The standoff pin tops 22 can be attached to a rail using suitable fastenings (a rail 72 is shown in FIGS. 7 and 11). One or more partial holes 24 that are used to permit vacuum system attachment are shown in each end pad 14 and in more detail in FIGS. 5 and 6.

FIG. 2 is an oblique cutaway view of the vacuum cup 10 from above. Representative pads 14 and 16 are shown cut away to reveal an end pad stiffener 26 and intermediate pad stiffeners 28 within their respective pads 14 and 16. Similar stiffeners are fully shown in FIGS. 3 and 4.

Figure 3:
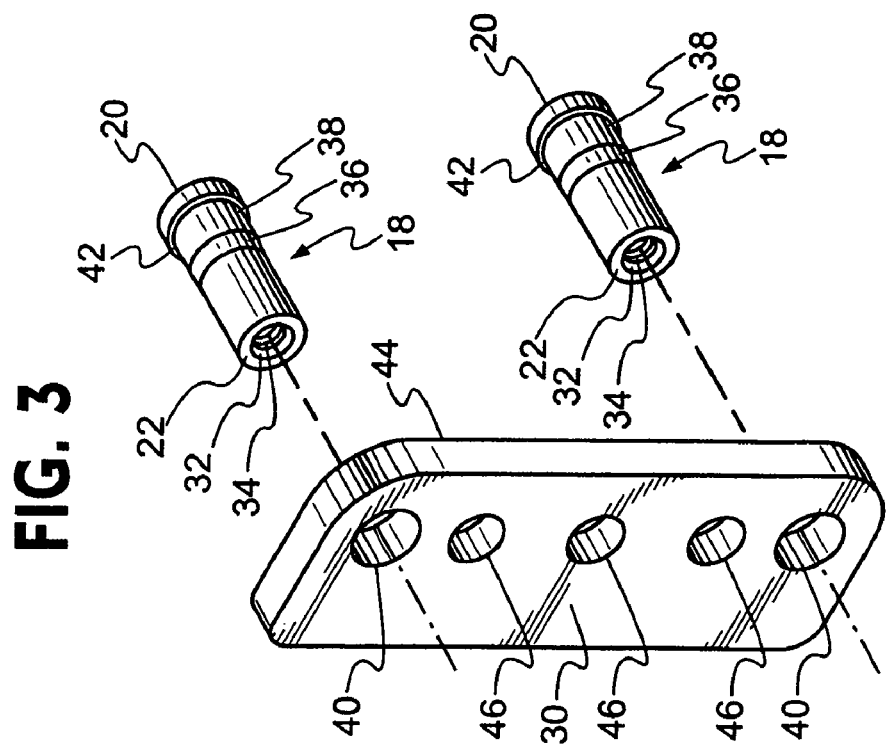
FIG. 3 is an exploded view of an end stiffener and associated standoff pins according to the embodiment of FIG. 1.

FIG. 3 is an oblique exploded view showing an end stiffener 30 substantially similar to the corresponding stiffener 26 in FIG. 2. The stiffener 30 is shown with two standoff pins 18 oriented for insertion. Each of the exemplary standoff pins 18 in FIG. 3 has a pin top 22 with a chamfer 32 and a female thread 34 for attachment to a rail 72 (shown in FIGS. 7 and 11). A taper section 36 and an interference-fit section 38 on each standoff pin 18 can allow the pin 18 to be pressed substantially permanently into the corresponding hole 40. A shoulder 42 can provide an integral stop to allow the pin 18 to bear against the stiffener 26 or 30, with the pin bottom end 20 at a uniform distance from the bottom surface 44 of the stiffener 26 or 30. Three bores 46 in the end stiffener 30 can be used to provide passage for vacuum connection (shown in FIGS. 5 and 6).

Figure 4:
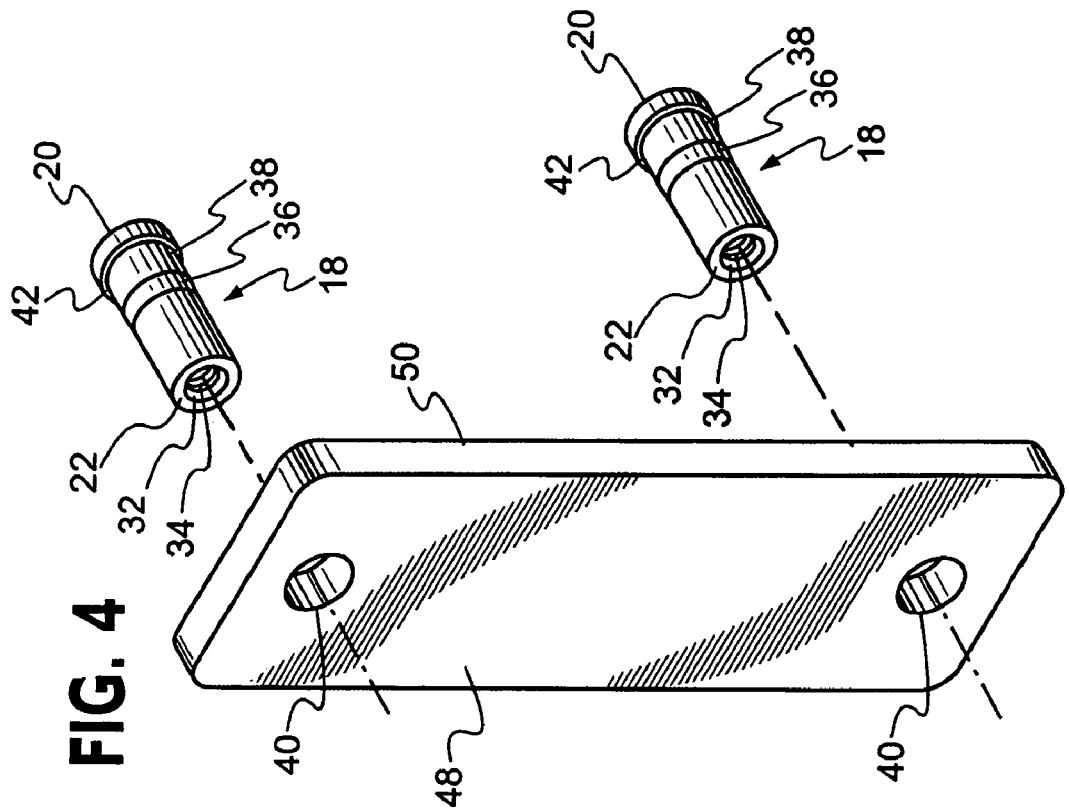
FIG. 4 is an exploded view of an intermediate stiffener and associated standoff pins according to the embodiment of FIG. 1.

FIG. 4 is an oblique exploded view showing an intermediate stiffener 48 substantially similar to the corresponding stiffener 28 in FIG. 2. The stiffener 48 is shown with two standoff pins 18 oriented for insertion. Each of the pins 18 in FIG. 4 has a pin top 22 with a chamfer 32 and a female thread 34 for attachment to a rail 72 (shown in FIGS. 7 and 11). A tapered section 36 and an interference-fit section 38 on each pin 18 can allow the pin 18 to be pressed essentially permanently into the corresponding hole 40. A shoulder 42 can provide a stop that allows the pin 18 to bear against the stiffener 48, with the pin bottom end 20 at a uniform distance from the bottom surface 50 of the stiffener 28 or 48.

Returning to FIG. 2, the sealing lip 12 is shown relaxed and deflected downward in its rest orientation. Inscribed around most of the perimeter of each of the pads 14 and 16 is a kerf or lower slot 60. An upper groove or slot 62 is present as well. The two kerfs 60 and one groove 62 together provide some degree of decoupling between each two stiffeners 26, 28, 30, or 48, allowing the stiffeners 26, 28, 30, or 48 to draw together or move apart as flexed by the rail 72 (shown in FIGS. 7 and 11) to which they are fastened, and/or to twist relative to each other if so driven by the mounted curve profile of the rail 72.

FIG. 5 is a section through FIG. 1 at section line 5-5. This shows that the first partial hole 24 in the bottom face 52 of an end pad 14 aligns with a second partial hole 54 in the top face 56, shown in FIG. 2, of the end pad 14. The two partial holes 24 and 54 are separated by a diaphragm 58, and may preferably be positioned within one of the bores 46 in the end stiffeners 26 and 30.

FIG. 6 is a section view of a barbed tubing coupling 64 inserted into a vacuum cup 10. After the diaphragm 58 has been pierced, for example using an ordinary sewing needle, a barbed coupling 64 of suitable size can be inserted into the second partial hole 54. The barbed coupling 64, preferably carrying a single barb on each end as shown, preferably passes through the pierced diaphragm 58 and uses the pierced diaphragm 58 as a locking element to retain the barbed coupling 64. Various options may be preferable in some applications, such as using multiple-barb ends on the barbed coupling 64 or passing the barbed coupling 64 through the pierced diaphragm 58 and the first partial hole 24, although preferably not extending the barbed coupling 64 so far through the bore 46 as to extend beyond the pin bottom end 20 and contact the workpiece 70. The top of the barbed tubing coupling 64 is shown to be set at a right angle 66. The right angle 66 shown may be preferable to allow a vacuum line 68 to deliver vacuum to the vacuum cup 10 without a sharp bend in the line 68. Other angles and other fitting styles may be preferable in some applications.

Returning once more to FIG. 1, the multiplicity of partial holes 24 in the end pads 14 can be used to provide optional vacuum connections. In some embodiments it may be preferable to plumb all vacuum cups 10 individually back to a common manifold. This can permit a manifold with valving to apply vacuum systematically, for example applying vacuum first to vacuum cups 10 located near mid rail, then sequentially activating cups outward toward both ends.

Experimentation has shown that for at least some combinations of materials and dimensions, a pierced diaphragm 58 may leak substantially no air when no barbed coupling 64 has been installed in it. This can allow the vacuum cup 10 in which the pierced diaphragm 58 exists to hold vacuum acceptably. By extension, a vacuum cup 10 may remain usable with multiple diaphragms 58 that are unused but have been pierced.

Figure 10:
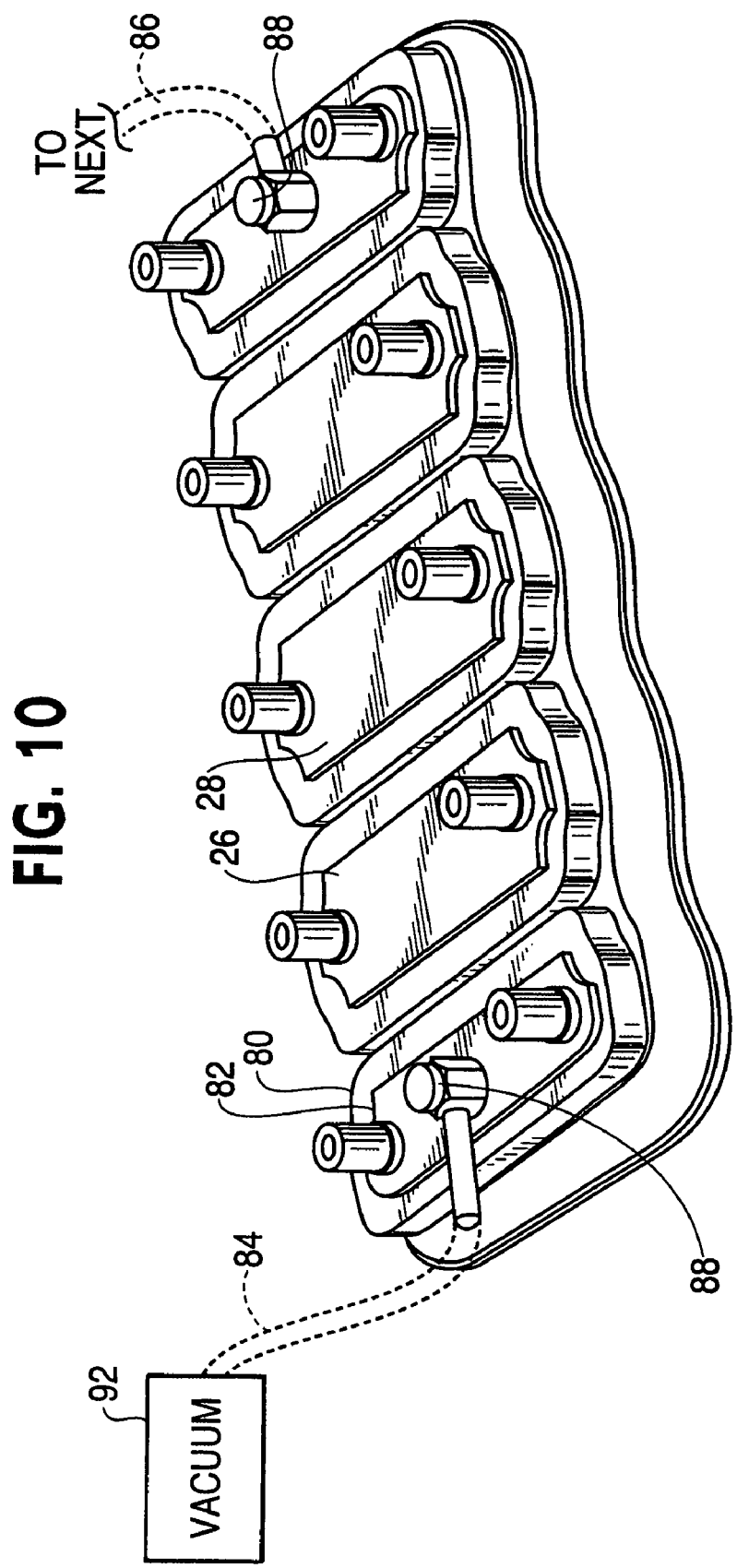
FIG. 10 is an oblique view from above of a conformal vacuum cup according to an alternative embodiment of the invention.
Figure 11:
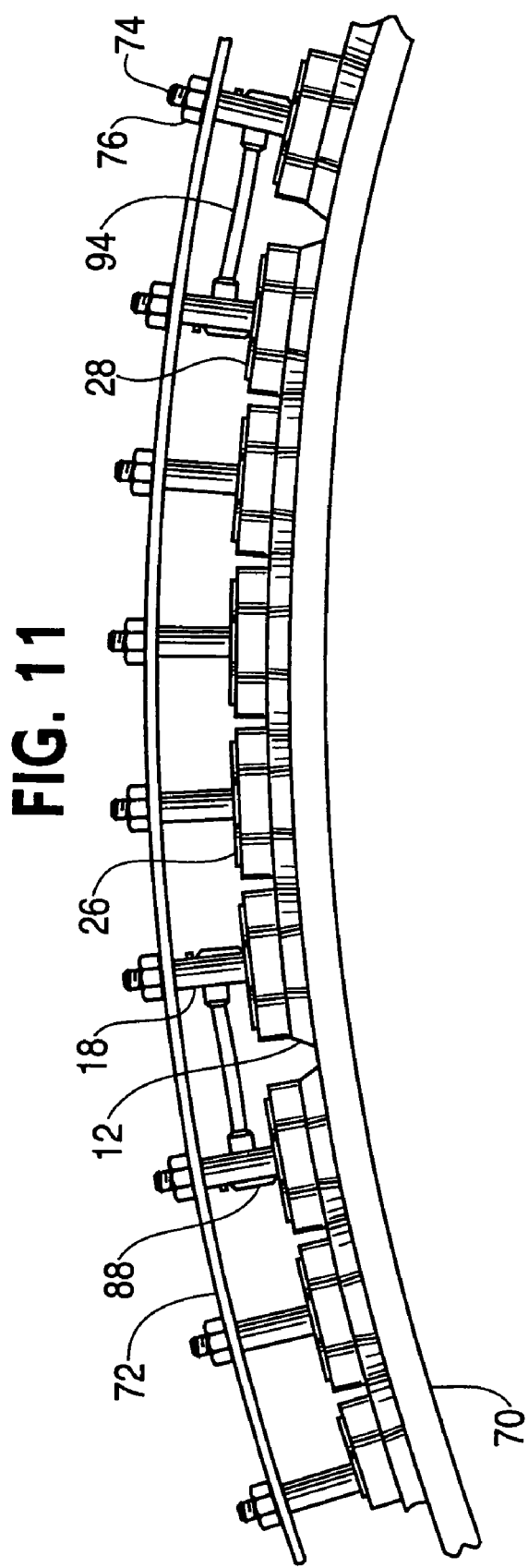
FIG. 11 is a side view of a multiplicity of conformal vacuum cups according to the alternative embodiment of FIG. 10, showing attachment to a rail and a curved workpiece.

Since the baseline configuration for the exemplary embodiment employs a common area below the entire vacuum cup 10, vacuum drawn at a first pierced partial hole 24 can be extended out through a second pierced partial hole 24 (as shown in FIG. 10). Another barbed tubing coupling 64 can be added to connect the vacuum source to a second vacuum cup 10 without using a manifold port at the vacuum source for every vacuum cup 10. Providing an ample number of partial holes 24 in the embodiment permits a variety of options for distributing vacuum in a rail-mounted machine tool system with a vacuum cups 10 of a single design. The availability of additional partial holes 24 can permit the addition of sensors, gauges, and the like as well as additional vacuum cups 10.

Continuing in FIG. 1, the standoff pins 18 are shown surrounded by the elastomer of the pads 14 and 16. The pin bottom ends 20 can be domed with a radius roughly equal to the elastic deformation of the workpiece 70 effected by the pressure stemming from the applied vacuum plus a portion of the weight of the rail-mounted drilling system. If the elastic deformation of the workpiece 70 can be shown to be negligible, then a satisfactory pin bottom end 20 shape may be achievable with a flat face square to the workpiece and a smooth edge roundoff. The pin bottom end 20 shape, radius of curvature, and size may preferably be chosen to at least minimize scuffing or marring of the workpiece 70.

FIG. 7 is a side view with a partial cutaway, revealing the structure of a vacuum cup 10 pressed against a workpiece 70 and attached to a rail 72 with studs 74, nuts 76, and washers 78. The lip 12 is flexed upward from its rest position as a result of application of vacuum. In FIG. 7, a flat workpiece 70 is contacted by the standoff pins 18, causing the rail 72 to assume a flat shape, parallel to the workpiece 70.

FIG. 8 is a section through the vacuum cup 10 of FIG. 1, in which the kerfs 60 and upper groove 62 are shown as they would be with a vacuum cup 10 positioned on a flat workpiece 70. Where the workpiece 70 surface is curved, the standoff pins 18 (shown in FIGS. 1 and 2) are drawn by the vacuum to conform to that curve, shifting the stiffeners 28 and 30, and causing the elastomer between the kerfs 60 and the upper groove 62 to flex. This flexure allows the vacuum cup 10 to conform to a workpiece 70 with a relatively sharp curvature, and thus to cause the rail 72 to so conform. Twist in the workpiece 70 can be accommodated as well, with the elastomer flexing as necessary.

FIG. 9 is a section through an alternative vacuum cup configuration retaining the upper groove 62 but without kerfs. This configuration may be preferable on some workpieces, for example where curvature is slight or nonexistent along the rail longitudinal axis.

Alternative methods for fastening standoff pins to a rail could include welding, brazing, and equivalent metallurgical bonding methods, as well as application of a flange to the top of each standoff pin, which flange could have multiple radially-arrayed holes for rivets or other fastenings. The stud 74, nut 76, and washer 78 of the exemplary embodiment can be replaced by other threaded fasteners, such as screws with or without washers, and can be prevented from loosening by application of antivibration materials, upset threads, and other technologies.

FIG. 10 is an oblique view of a conformal vacuum cup 10 according to another design. Here, the lip 12 is made wavy instead of straight-edged as in FIGS. 1-9. In the embodiment shown, the elastomeric material 80 does not surround the stiffeners 28 and 30 above an attachment shoulder 82. The embodiment shown has one inlet vacuum line 84 and one outlet vacuum line 86, with no provision for additional vacuum lines. In this embodiment, a fitting 88 is employed to seal to a threaded hole and connect to a vacuum hose 94 at an approximate right angle. FIG. 10 further shows in schematic form the use of a vacuum source 92 connected by a vacuum hose 94 to use the vacuum cup 10. In the embodiment shown, a second fitting 88 connects to a second vacuum hose 86 to carry vacuum to another vacuum cup 10 or to an accessory such as a gauge.

FIG. 11 shows multiple samples of the conformal vacuum cup 10 of FIG. 10 attached to a curved rail 72 using studs 74, nuts 76, and washers 78. Also shown is a convex-curved workpiece 70. The curvature of the rail 72 requires the flexing of the conformal vacuum cups 10 to accommodate the drawing together of the individual stiffeners 30 and 48 shown in FIGS. 3 and 4.

The stiffeners 26, 28, 30, and 48 described herein can preferably be fabricated from a material with specific physical properties. One such desirable stiffener property is higher flexure resistance than the rail 72 and/or the workpiece 70, particularly in the thickness used. Another such desirable stiffener property is compatibility with insertion of pins 18, which compatibility includes adequate malleability to permit pin 18 insertion and similarity in temperature coefficient of expansion to the pins 18. Another such desirable stiffener property is compatibility with the elastomeric overmolding material, which compatibility includes tolerance of the temperatures at which the molding takes place and chemical compatibility with the overmolding material. Typical materials likely to be suitable include various aluminum and stainless steel alloys, fiber reinforced phenolics, engineering plastics such as PEEK®, and others.

Suitable elastomers for the vacuum cup overmolding material include a class of synthetic rubbers known generically as urethanes. Other classes of elastomers, such as vinyls, as well as other formable materials, may, like urethanes, have adequate ranges of durometer values and acceptable physical properties such as tear resistance for repeated use and may exhibit an ability to withstand rough treatment. Urethanes in the preferred range of durometers can in some formulations exhibit a desirable ability to cling to surfaces, which ability may add to the positioning force of the vacuum cups 10. Vinyls may exhibit significantly lower cling than urethanes, which may be preferable in some embodiments. Other elastomers may likewise exhibit desirable combinations of attributes for specific uses.

Forcing air, such as from a compressor, through a vacuum cup system may allow the cups to function as air bearings to make tool repositioning easier and quicker. Specific features such as lip shape, interface surface profile, elastomer material choice, and available air flow rate may inhibit or facilitate such use.

The many features and advantages of the invention are apparent from the detailed specification, and, thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and, accordingly, all suitable modifications and equivalents may be resorted to that fall within the scope of the invention.

What is claimed is:

1. A method of manufacturing an aircraft, the method comprising:
   urging a tool-carrying rail to follow a contour of the aircraft, wherein curvature of the tool-carrying rail is transferred via a series of standoff pins to a series of stiffening pads encapsulated within a vacuum cup;
   removably attaching the tool-carrying rail to a rail-side surface of the aircraft with the vacuum cup, the tool-carrying rail including a longitudinal axis to mount a tool, the vacuum cup being stiffened along a first axis transverse to the longitudinal axis of the tool-carrying rail and the vacuum cup being stiffened along a second axis parallel to the rail-side surface of the aircraft, wherein removably attaching the tool-carrying rail further comprises:
      removably sealing a perimeter of the vacuum cup to the rail-side surface of the aircraft against vacuum loss;
      rigidly positioning a point on the rail with respect to a point on the rail-side surface of the aircraft; and
      coupling a vacuum source to a spatial volume occupying all of a space between the vacuum cup and the rail-side surface of the aircraft; and
   slidably positioning the tool along the longitudinal axis of the tool-carrying rail.

2. The method according to claim 1, wherein the tool includes a drilling device and the method further includes:
   sliding the drilling device along the longitudinal axis of the tool-carrying rail;
   positioning the drilling device at a predetermined hole boring location; and
   boring a hole in the aircraft in response to the drilling device being at the predetermined hole boring location.

3. The method according to claim 1, wherein the tool includes a riveting device and the method further includes:
   sliding the riveting device along the longitudinal axis of the tool-carrying rail;
   positioning the riveting device at a predetermined rivet location; and
   installing a rivet in the aircraft in response to the riveting device being at the predetermined rivet location.

4. The method according to claim 1, further comprising:
   separating by a substantially uniform gap adjacent stiffened pads from each other;
   sealing against vacuum leakage adjacent pads separated from each other; and
   dynamically varying a distance and angle of separation between separated pads.

5. The method according to claim 1, further comprising:
   removably attaching the tool-carrying rail to a contoured surface of the aircraft, wherein the contoured surface includes a relatively high curvature and wherein the vacuum cup and the tool-carrying rail substantially conform to the relatively high curvature.

6. The method according to claim 5, wherein the contoured surface includes a skin of a fuselage of the aircraft.

7. The method according to claim 5, wherein the contoured surface includes a skin of a wing of the aircraft.

8. A method of manufacturing a fuselage of an aircraft, the method comprising:
   urging a tool-carrying rail to follow a contour of the fuselage, wherein curvature of the tool-carrying rail is transferred via a series of standoff pins to a series of stiffening pads encapsulated within a vacuum cup;
   removably attaching the tool-carrying rail to a rail-side surface of the fuselage with the vacuum cup, the tool-carrying rail including a longitudinal axis to mount a tool, the vacuum cup being stiffened along a first axis transverse to the longitudinal axis of the tool-carrying rail and the vacuum cup being stiffened along a second axis parallel to the rail-side surface of the fuselage, wherein removably attaching the tool-carrying rail further comprises:
      removably sealing a perimeter of the vacuum cup to the rail-side surface of the fuselage against vacuum loss;
      rigidly positioning a point on the rail with respect to a point on the rail-side surface of the fuselage; and
      coupling a vacuum source to a spatial volume occupying all of a space between the vacuum cup and the rail-side surface of the fuselage; and
   slidably positioning the tool along the longitudinal axis of the tool-carrying rail.

9. The method according to claim 8, wherein the tool includes a drilling device and the method further includes:
   sliding the drilling device along the longitudinal axis of the tool-carrying rail;
   positioning the drilling device at a predetermined hole boring location; and
   boring a hole in the fuselage in response to the drilling device being at the predetermined hole boring location.

10. The method according to claim 8, wherein the tool includes a riveting device and the method further includes:
    sliding the riveting device along the longitudinal axis of the tool-carrying rail;
    positioning the riveting device at a predetermined rivet location; and
    installing a rivet in the fuselage in response to the riveting device being at the predetermined rivet location.

11. The method according to claim 8, further comprising:
separating by a substantially uniform gap adjacent stiffened pads from each other;
sealing against vacuum leakage adjacent pads separated from each other; and
dynamically varying a distance and angle of separation between separated pads.

12. The method according to claim 8, further comprising:
removably attaching the tool-carrying rail to a contoured surface of the fuselage, wherein the contoured surface includes a portion of a circumference of the fuselage and wherein the vacuum cup and the tool-carrying rail substantially conform to the portion of the circumference of the fuselage.

13. A method of manufacturing a wing of an aircraft, the method comprising:
urging a tool-carrying rail to follow a contour of the wing, wherein curvature of the tool-carrying rail is transferred via a series of standoff pins to a series of stiffening pads encapsulated within a vacuum cup;
removably attaching the tool-carrying rail to a rail-side surface of the wing with the vacuum cup, the tool-carrying rail including a longitudinal axis to mount a tool, the vacuum cup being stiffened along a first axis transverse to the longitudinal axis of the tool-carrying rail and the vacuum cup being stiffened along a second axis parallel to the rail-side surface of the wing, wherein removably attaching the tool-carrying rail further comprises:
removably sealing a perimeter of the vacuum cup to the rail-side surface of the wing against vacuum loss;
rigidly positioning a point on the rail with respect to a point on the rail-side surface of the wing; and
coupling a vacuum source to a spatial volume occupying all of a space between the vacuum cup and the rail-side surface of the wing; and
slidably positioning the tool along the longitudinal axis of the tool-carrying rail.

14. The method according to claim 13, wherein the tool includes a drilling device and the method further includes:
sliding the drilling device along the longitudinal axis of the tool-carrying rail;
positioning the drilling device at a predetermined hole boring location; and
boring a hole in the wing in response to the drilling device being at the predetermined hole boring location.

15. The method according to claim 13, wherein the tool includes a riveting device and the method further includes:
sliding the riveting device along the longitudinal axis of the tool-carrying rail;
positioning the riveting device at a predetermined rivet location; and
installing a rivet in the wing in response to the riveting device being at the predetermined rivet location.

16. The method according to claim 13, further comprising:
separating by a substantially uniform gap adjacent stiffened pads from each other;
sealing against vacuum leakage adjacent pads separated from each other; and
dynamically varying a distance and angle of separation between separated pads.

17. The method according to claim 13, further comprising:
removably attaching the tool-carrying rail to a contoured surface of the wing, wherein the contoured surface includes a portion of a skin of the wing, the portion of the wing being transverse to a longitudinal axis of the wing, and wherein the vacuum cup and the tool-carrying rail substantially conform to the portion of the circumference of the fuselage.

\* \* \* \* \*